Jan. 31, 1956

J. P. NEWBOLD 2,733,328

MEANS FOR RETAINING FLUX ON WORK DURING
THE PROCESS OF SUBMERGED ARC WELDING

Filed Sept. 24, 1953

JOSEPH P. NEWBOLD
*INVENTOR.*

BY *Robt Meyer*
*atty*

United States Patent Office 2,733,328
Patented Jan. 31, 1956

2,733,328

MEANS FOR RETAINING FLUX ON WORK DURING THE PROCESS OF SUBMERGED ARC WELDING

Joseph P. Newbold, Sommerville, N. J., assignor to Worthington Corporation, Harrison, N. J., a corporation of Delaware Application September 24, 1953, Serial No. 382,175

7 Claims. (Cl. 219—8)

This invention relates generally to submerged arc welding and more particularly to a means for retaining the flux on the work being welded.

In submerged arc welding where the electric arc is completely submerged under a special granulated material or welding composition, for example, that known as "unionmelt," difficulty in retaining the welding composition on the seam or section to be welded occurs where the surface is rounded or sloping downwardly.

The present invention overcomes this problem by providing a flexible dam which assumes the contour of the work on which the weld is being made and is held in a position adjacent the welding point by supporting means which includes magnets.

Accordingly, it is an object of the present invention to provide a means for retaining the flux or welding composition at or on the point where the weld is to be made.

With this and other objects in view, as may appear from the accompanying specification, the invention consists of various features of construction and combination of parts, which will be first described in connection with the accompanying drawings, showing means for retaining flux on work during the process of submerged arc welding of a preferred form embodying the invention, and the features forming the invention will be specifically point out in the claims.

Figure 2:
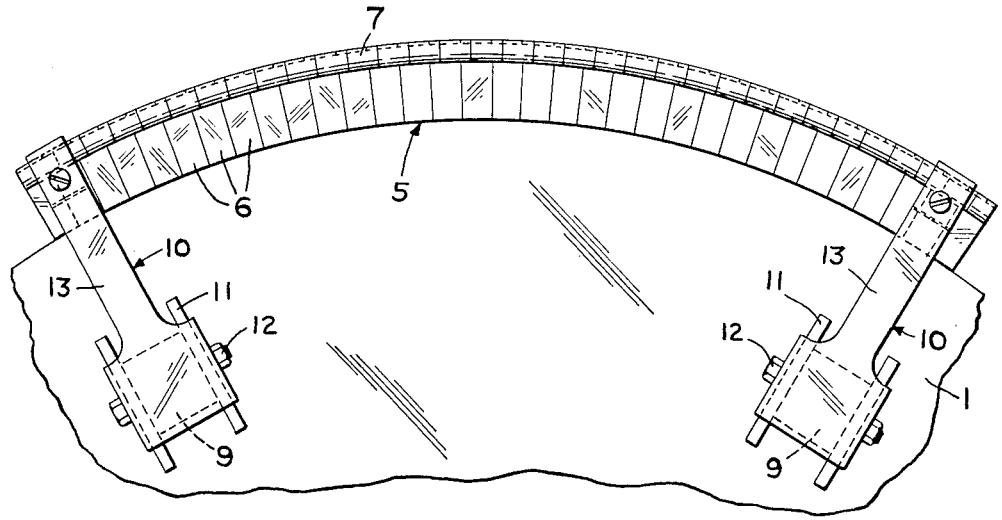
Figure 2 is a front view showing the invention mounted on work being welded.
Figure 1:
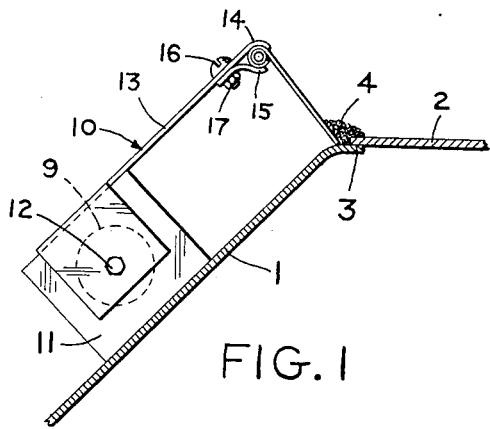
Figure 1 is a side view showing the invention mounted on work being welded.

Referring more particularly to the drawings, Figures 1 and 2 show a piece of work having the invention mounted thereon for welding a seam. It will be understood, however, that while a seam is shown that this invention is equally applicable to other types of welding positions.

Thus, a first piece of metal 1 and a second piece of metal 2 are shown as held by any suitable means so that the edges of one are disposed to be disjoined to the edges of the other to form a seam as at 3.

In order to weld the seam at 3 by the submerged electric arc process either automatic or semi-automatic, it is necessary to cover the rod at the point being welded with the flux or welding composition 4. However, where the work slopes downwardly or is positioned so that the flux will fall or drop off, it is obvious that a proper submerged arc weld cannot be conducted.

In the present invention, Figures 1 and 2 show that the welding composition 4 can be retained at the desired site by a flexible dam generally designated 5.

Flexible dam

The flexible dam 5 is a substantially elongated element consisting of a plurality of metal elements 6 of brass, aluminum, stainless or rustless steel each having a looped end as at 7 to allow each of these elements to be mounted in abutting relationship on a flexible shaft 8.

Figure 3:
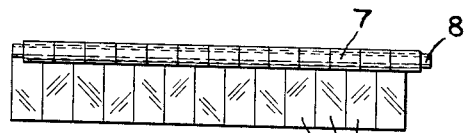
Figure 3 shows a front view of a fragment of the flexible dam.
Figure 4:
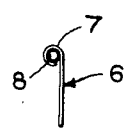
Figure 4 shows an end view of one of the elements of the flexible dam.

Figures 2 and 3 further show that the body portions of the brass or aluminum elements 6 are substantially square and that the body portions are offset from the looped ends 7 of each of the elements. It will be understood that while the body portions are shown as square that they may be tapered without departing from the spirit of the present invention. The offset construction between the body portion and the looped portions allows the elements of the flexible dam to take the contour of the surface adjacent to the point where the weld is to be made.

Supports for flexible dam

The flexible dam 5 is supported at both ends by magnetic devices 9 having brackets 10 connected at one end to the magnets and the other end to the flexible dam 5 as is hereinafter described. The magnets may be either the permanent type or electro-magnets, both of which are well known in the art and easily purchasable on the open market and hence not more fully described herein. The magnets, however, will include any suitable types of arms or related elements 11 which will pivotally support as at 12 one end of the bracket 10.

Brackets 10 will include an elongated arm 13 which at the end remote from the magnetic device 9 is rounded as at 14 so that it can coact with a clamping jaw 15, all of which is clearly shown in Figure 1 of the drawings.

The rounded end of the elongated arm 13 and the clamping jaw 15 are adapted to fit about the looped portion 7 of the brass or aluminum element 6. A screw 16 and nut 17 are utilized to tighten or loosen the clamping jaw so that the bracket can be connected to the flexible dam. As is shown in Figure 2, there are two brackets 10 which are disposed in spaced relation so that their respective ends may engage the looped portions of the element 6 one on each side of the flexible dam.

Figure 5:
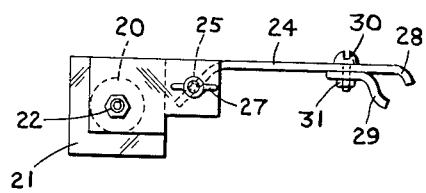
Figure 5 shows a side view of a modified form of support means for the flexible dam.
Figure 6:
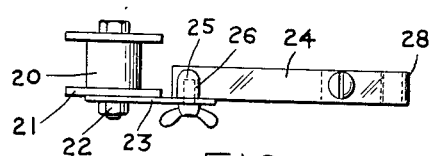
Figure 6 shows a top view of the modified form of support means shown in Figure 5.

Figures 5 and 6 show a modified form of support for the flexible dam 5 which will facilitate positioning the flexible dam in reverse or downhand or the like types of overhanging positions.

Thus the magnetic device 20 similar to that in the form of the invention shown in Figures 1 and 2, may be permanent or electromagnets. Fixedly connected to one of the arms 21 of the magnetic device 20 by a threaded member 22 is a support 23 which extends outwardly of the magnetic device 20 to pivotally receive an elongated supporting arm 24.

The elongated supporting arm 24 has a thickened portion 25 provided with a threaded bore 26 into which the thumb screw 27 can be threaded to pivotally connect the elongated support arm 24 to the support 23, all of which is clearly shown in Figures 5 and 6.

The other end of the elongated support arm 24 will have the same construction as above described for the form of the invention shown in Figures 1 and 2. Thus the outermost end is rounded as at 28 to coact with the clamping jaw 29 so that the elongated arm can be similarly affixed to the looped portion 7 of the brass or aluminum element 6 at either end of the flexible dams. The screw 30 and nut 31 are likewise utilized to tighten or loosen the clamping jaw 29 when it is desired to attach or remove the modified support to the flexible dam 5.

Operation

The operation of the present device is quite simple. When a welding site requires the use of the flexible dam because of its peculiar location, a pair of either one or the other of the supports for the flexible dam as above described are fixed to the ends of the flexible dam 5.

The magnetic portions 9 and their respective arms are attached to the metal surfaces and close to the work or area to be welded and then the dam adjusted to the most desirable position for holding the welding composition over the point being welded. The brass elements 6 are moved into position so that they abut the surface of the work adjacent to the point or position being welded.

Flux or welding composition is then poured over the area to be welded or the point where the weld is to occur and then the submerged electric arc begun in the manner well known in the art.

It will be understood that the invention is not to be limited to the specific construction nor arrangement of parts shown but that they may be widely modified within the invention defined by the claims.

What is claimed is:

1. Means for retaining flux on work during the welding thereof comprising, a flexible dam including a plurality of elements mounted adjacent each other on a flexible shaft, means for supporting said flexible dam and connected to the dam on both ends thereof, said means including at least one magnet adapted to affix itself to said work.

2. In a means for retaining flux on work during the welding thereof as claimed in claim 1 wherein said support means is adjustable for positioning said flexible dam.

3. Means for retaining flux on work during the welding thereof comprising, a flexible dam including a plurality of elements, each of said elements having a body portion and a looped portion offset therefrom, and said looped portion to provide means for mounting the elements on a flexible shaft, means for supporting said flexible dam connected to the looped portion of at least one of said elements on both ends of the flexible dam, and said means including at least one magnetic device adapted to affix itself to said work.

4. In a means for retaining flux on work during the welding thereof as claimed in claim 3 wherein said support means is adjustable for positioning said flexible dam.

5. In a means for retaining flux on work during the welding thereof as claimed in claim 1 wherein said support means includes magnetic devices in spaced relation, elongated arms pivotally connected at one end to each of said magnetic devices, the ends of said elongated arms remote from said pivotal end having clamping jaws, said clamping jaws to engage opposite ends of said flexible dam.

6. In a means for retaining flux on work during the welding thereof as claimed in claim 1 wherein said support means includes magnets in spaced relation, a support fixedly connected to said magnets, elongated arms pivotally connected at one end to each of said supports for movement in an arc greater than 180°, the end of said elongated arms remote from said pivoted end having clamping jaws, and said clamping jaws to engage opposite sides of said flexible dam.

7. An apparatus for retaining flux on metal sections to be welded to one another comprising a flexible member, a plurality of elements disposed on said member in abutting relationship with one another to form a dam for retaining flux thereagainst, arm means detachably connected to said dam for supporting said dam, and magnet means pivotally connected to said arm means for positioning the dam adjacent the sections to be welded.

References Cited in the file of this patent

UNITED STATES PATENTS

| | | |
|---|---|---|
| 2,262,212 | Stone | Nov. 11, 1941 |
| 2,395,723 | Chmielewski | Feb. 26, 1946 |
| 2,430,266 | Zimmerman | Nov. 4, 1947 |
| 2,678,987 | Talley | May 18, 1954 |